United States Patent Office 3,574,194
Patented Apr. 6, 1971

3,574,194
1-(α-ETHYL - α - METHYL-SUCCINIMIDO) - 4-SULPHONAMIDOBENZENE AND RELATED COMPOUNDS
Rolf Wilhelm Pfirrmann, Lucerne, Switzerland, assignor to Ed. Geistlich Sohne AG fur Chemische Industrie, Wolhusen, Lucerne, Switzerland
No Drawing. Continuation of application Ser. No. 578,462, Sept. 12, 1966. This application Nov. 26, 1969, Ser. No. 873,741
Claims priority, application Great Britain, Oct. 19, 1965, 44,246/65
Int. Cl. A61k 27/00; C07d 27/10
U.S. Cl. 260—239.6
10 Claims

ABSTRACT OF THE DISCLOSURE

A compound is provided selected from (a) compounds of the formula

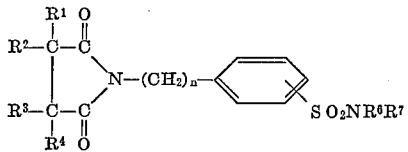

wherein $R^1$, $R^2$, $R^3$ and $R^4$ are each hydrogen or alkyl of 1–5 carbon atoms, at least one of $R^1$, $R^2$, $R^3$ and $R^4$ being alkyl of 1–5 carbon atoms and $R^6$ and $R^7$ are each hydrogen, thiazolyl, pyrimidyl, alkyl of 1–5 carbon atoms, acetyl, β-hydroxyethyl, n-butylcarbamyl or ethoxycarbonyl-methyl or $R^6$ and $R^7$ together with the nitrogen atom to which they are attached are piperidyl or piperazyl and $n$ is 0 or 1; (b) compounds corresponding to said compounds (a) wherein the —$SO_2NR^6R^7$ group is joined to a substituent on an adjacent carbon atom of the benzene ring to form the chain —CO—NH—$SO_2$—; (c) compounds corresponding to said compounds (a) and (b) substituted on the benzene ring by at least one of halogen, lower alkyl, alkoxy of 1–5 carbon atoms, hydroxy, alkanoyl amido of 1–5 carbon atoms, nitro, amino, carboxyl, acetyl or phenyl lower alkanoyl; and (d) salts of said compounds (a), (b) and (c) with alkali metals, ammonia or amines.

This invention relates to novel compounds of use in the treatment of epilepsy and to processes for their preparation.

The compound α-ethyl-α-methyl-succinimide has been shown to be effective against the Petit Mal form of epilepsy but it is far less effective against the Grand Mal form and its effective dose level then approaches the toxic dose level.

We have now found that certain derivatives of α-ethyl-α-methyl-succinimide and related compounds, which are more precisely defined below, are significantly more physiologically compatible and possess an excellent ratio of anti-convulsant activity to unwanted side effects.

According to the present invention we provide compounds of the general formula

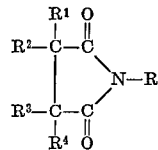

where

R represents an aryl or araliphatic group substituted in the aromatic ring with at least one sulphonamido group, the nitrogen atom of which may if desired be joined to a further ring substitutent; and
$R^1$, $R^2$, $R^3$ and $R^4$, which may be the same or different are hydrogen atoms, alkyl groups having 1–5 carbon atoms, at least one of the substituents $R^1$, $R^2$, $R^3$ and $R^4$ being other than hydrogen; and their salts with bases.

These compounds posses particularly favourable pharmacological properties as hereinafter set forth including strong anticonvulsant activity and particularly good compatibility and are useful in the treatment of epilepsy. They also exhibit diuretic activity due to possession of a sulphonamido group.

R may, for example be a phenyl group which in addition to a sulphonamido group, may carry one or more such substitutents as aliphatic hydrocarbon groups, e.g. lower alkyl groups for example methyl, ethyl or propyl groups, ether groups such as alkoxy groups having 1–5 carbon atoms, for example methoxy or ethoxy groups, hydroxy groups, acylamido groups, such as formamido, acetamido or diacetamido groups, nitro groups, amino groups, carboxyl groups, acyl groups such as acetyl or benzoyl groups, or halogen atoms.

Those compounds are particularly preferred in which R is a group of the formula

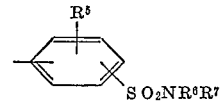 III where $R^5$ represents one or more hydrogen or halogen atoms, e.g. fluorine, chlorine or bromine atoms, or aliphatic hydrocarbon, ether, hydroxy or acylamino groups and
$R^6$ and $R^7$ which may be the same or different, are hydrogen atoms, heterocyclic groups such as pyridyl, pyrimidyl or imidazolyl groups or aliphatic hydrocarbon groups which may, if desired, carry substituents such as oxa, hydroxyl, carboxyl or esterified carboxyl, or amino or alkylamino groups, or together with the nitrogen atom to which they are attached, form a heterocyclic group, e.g. a piperidyl or piperazyl group.
$R^5$ can also advantageously be a carboxyl group or together with $NR^6R^7$ form a —CO—NH—$SO_2$— chain.
$R^6$ and $R^7$ may, for example, be alkyl groups having 1–5 carbon atoms, i.e. methyl, ethyl, propyl, butyl or amyl groups, acyl groups such as acetyl or benzoyl groups, carbamyl groups, the e.g. n-butylamino-carbonyl group, hydroxyalkyl groups, e.g. β-hydroxyethyl, or esterified carboxyalkyl groups e.g. ethoxy-carbonyl-ethyl groups. The preferred compounds, however, are those in which $R^6$ and $R^7$ are both hydrogen. The sulphonamido group is preferably in the 4-position relative to the succinimido group.

The substituents $R^1$ and $R^2$ are preferably a methyl and an ethyl group respectively while $R^3$ and $R^4$ are preferably both hydrogen atoms.

The new compounds form salts with bases, for example alkali metal salts, e.g. sodium salts or salts with ammonia or amines.

The compound N-(α-ethyl-α-methyl-N-succinimido)-4-sulphonamido-benzene has shown especially favourable properties in our pharmacological tests, its peroral $LD_{50}$ being of the order of 4000 mg./kg. or greater in mice as compared with α-ethyl-α-methyl-succinimide which has a peroral $LD_{50}$ in mice of about 1500 mg./kg. In the electro-shock test, which is indicative of action against Grand Mal epilepsy, its peroral $ED_{50}$ in mice was as low as 5 mg./kg. while in albino rats the corresponding value was 25 mg./kg. α-Ethyl-α-methyl-succinimide shows an $ED_{50}$ in the same tests of 500 mg./kg. In the cardiazol shock test, which is indicative of effectiveness against Petit Mal epilepsy, the peroral $ED_{50}$ of N-($\alpha$-ethyl-$\alpha$-methyl-succinimido) - 4 - sulphonamido-benzene was shown to be 600 mg./kg., as against 200–300 mg./kg. for $\alpha$-ethyl-$\alpha$-methyl-succinimide but it will be noted that the ratio of $ED_{50}/LD_{50}$ is significantly better for the compound according to the invention. This compound showed no sedative activity up to 200 mg./kg. Other compounds according to the invention have similar properties.

According to a further feature of the invention we provide pharmaceutical compositions containing one or more compounds according to the invention together with one or more pharmaceutical carriers or excipients.

Thus, for example, the compositions may take the form of tablets, dragées, capsules, lozenges, suppositories, ampoules for injection, solutions, etc.

The carriers or excipients in such compositions may, for example be those conventional for such forms and may include starch, lactose, magnesium stearate, talc, gelatin, sterile water, or suspending, emulsifying, dispersing, thickening or flavouring agents.

Dosage units forms such as tablets, capsules, suppositories or ampoules are preferred and advantageously each unit contains 10 to 1000 mg. of active substances, preferably 100 to 300 mg.

The compositions, preferably contain the active substance at a concentration between 0.10 and 80.0% by weight.

According to a still further feature of the invention we provide a process for the preparation of compounds of the general Formula I as defined above wherein a compound of the general formula $$RHN_2 \qquad\qquad III$$

is reacted with a succinic acid derivative of the general formula $$HOOC\text{---}CR^1R^2\text{---}CR^3R^4\text{---}COOH \qquad IV$$

or a reactive derivative thereof, where $R^1$, $R^2$, $R^3$, $R^4$ and R have the meanings given above, to form the desired succinimido derivative.

The reaction may be effected in a single stage, or in two stages. In the latter case, the initial product will have the general formula

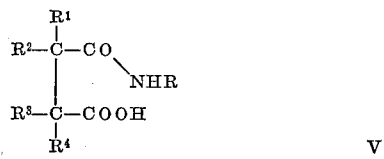

V (or its isomer in which the hemisuccinyl group is attached by the carbonyl adjacent to the groups $R^3$ and $R^4$) and may be isolated, if desired, before final cyclisation. In general the final condensation requires a reaction temperature of the order of 200° C. and for single stage condensations the reaction should be carried out at this order of temperature. The half-condensation of the succinic acid of Formula IV generally takes place within the range 80°–100° C.

Similarly, the initial condensation to form the product of Formula V is readily effected by merely heating in an inert solvent, e.g. a hydrocarbon, nitro-hydrocarbon, chlorohydrocarbon, ether or cyclic ether solvent. The second stage to effect cyclisation may be effected, for example, in the presence of a dehydrating agent such as an anhydrous salt, e.g. sodium acetate or sulphuric, phosphoric or polyphosphoric acid or phosphorus pentoxide or simply by heating to about 200° C. in the absence of a solvent with or without a vacuum.

The reaction time for the reaction with the free acid is preferably 1–5 hours, advantageously about 2 hours. The one-stage reaction with the anhydride is preferably effected at about 200° C. for a short time.

According to a modification of the reaction the amine $RNH_2$ may carry substituents capable of conversion to the desired substituents in R after cyclisation. Thus, for example, 6-amino-saccharin may be reacted with the acid of Formula IV or its anhydride to give a compound in which R carries adjacent sulphonamide and carboxyl groups, the cyclic amide ring having been split during the reaction.

The sulphonamido compounds according to the invention may also be prepared from corresponding compounds lacking a sulphonamido group by reaction with reagents for introducing a sulphonamido group. Thus, for example, a compound of Formula I in which R represents an aryl or araliphatic group having no sulphonamido group may be reacted with a sulphonyl halide, to form a halosulphonyl derivative which may then be reacted with ammonia or an amine of the formula NH—$R^6R^7$, where $R^6$ and $R^7$ have the above meanings. It is also possible to introduce an amino group by nitration and reduction and to convert this to sulphonyl halide by diazotisation and treatment with sulphur dioxide in the presence of cuprous halide. Similarly, a compound of Formula I in which R is a phenyl group carrying a free amino group may be prepared by the reaction of the corresponding aminobenzene derivative with the acid of Formula III or a reactive derivative thereof; if necessary the amino group may be protected before reaction.

The compounds of Formula I in which R has Formula II wherein one or both of $R^6$ and $R^7$ are hydrogen can be used to prepare derivatives thereof. Thus, for example, acylation gives the acyl derivatives e.g. by reaction with an acyl halide or anhydride; alkylation gives the alkyl derivatives, e.g. by reaction with an alkyl halide, sulphate, sulphonate etc. Hydroxyalkylation gives the hydroxyalkyl derivative, e.g. by reaction with ethylene oxide; carbamylation gives the corresponding urethane, e.g. by reaction with a carbonyl dihalide followed by reaction with ammonia or an amine.

In order that the invention may be well understood we give the following examples by way of illustration only:

EXAMPLE 1

(a) 1-N-($\alpha$-ethyl-$\alpha$-methyl-succinimido)-2-ethyl-benzene 14.3 g. methyl-ethyl-succinic acid-anhydride (1 mol) and 12.1 g. o-ethylaniline (1 mol) are heated together at 180° C. for about 15 minutes. The oil obtained is then distilled at 12 mm. to yield 19.8 g. light yellow oil. Yield: 80%.

The product was microdistilled for analysis: B.P. 140°/0.02 mm.

*Analysis.*—Calcd. for $C_{15}H_{19}NO_2$ (percent): C, 73.44; H, 7.81; N, 5.71. Found (percent): C, 73.45; H, 7.85; N, 5.56.

(b) 1-N-($\alpha$-ethyl-$\alpha$-methyl-succinimido)-2-ethyl-4-sulphonamido-benzene 10 ml. chlorosulphonic acid are added to 8.9 g. of the product of (a) above. The mixture is stirred for 30 minutes at 60° C. and then poured onto ice. The product is shaken with chloroform and 100 ml. concentrated ammonia are added with stirring to the chloroform solution. The mixture is heated for 15 minutes at 50° C., reduced to 50 ml. in vacuo and the precipitated product is filtered with suction.

5.7 g. brown product. Yield: 49%.

It was recrystallised from ethyl acetate/petrol ether to give white crystals M.P. 196–198° C.

*Analysis.*—Calcd. for $C_{15}H_{20}N_2O_4S$ (percent): C, 55.60; H, 6.22; N, 8.65. Found (percent): C, 55.48; H, 6.32; N, 8.51.

EXAMPLE 2

1 - N - (α-ethyl-α-methyl-succinimido)-4-(N-4',6',-dimethyl-pyrimid-2-yl)-sulphonamido)-benezene 142 g. α-ethyl-α-methyl-succinic acid anhydride is melted with 172 g. sulphadimidine (4,6-dimethyl-2-sulphanilamido-pyrimidine) at 180–190° C. After 2 hours the melt is allowed to solidify and the product is dissolved in the hot in 5 times its volume of methanol and filtered over animal charcoal. On cooling, the desired compound crystallises in colourless crystals. Yield: 110 g.; M.P. 185–186° C.

The substance was recrystallised from ethyl acetate for analysis.

Calcd. for $C_{19}H_{22}N_4O_4S$ (percent): C, 56.71; H, 5.51; N, 13.92. Found (percent): C, 56.50; H, 5.73; N, 14.1.

EXAMPLE 3

1-N-(α-ethyl-α-methyl-succinimido)-4-sulphonamido-benzene 17.2 g. sulphanilamide (1 mol) are heated for 30 minutes at 160° C. with 16.0 g. α-ethyl-α-methyl-succinic acid (1 mol).

The resulting oil is dissolved in ethyl acetate, cooled and filtered with suction to yield 16.7 g. white crystals; M.P. 153–155° C. Yield 56%.

The product was recrystallised from ethyl acetate for analysis.

Analysis.—Calcd. for $C_{13}H_{16}O_4N_2S$ (percent): C, 52.70; H, 5.44; N, 9.46. Found (percent): C, 52.80; H, 5.44; N, 8.84.

EXAMPLE 4

(a) 1-N-(α-ethyl-α-methyl-succinimido)-2-chloro-benzene 25.5 g. o-chloroaniline and 32.2 g. α-ethyl-α-methyl-succinic acid are heated together at 180° C., held at this temperature for 15 minutes and then distilled under high vacuum to yield:

32.7 g. of a yellow oil, boiling at 152–155° C./0.02 mm. Yield: 65%.

Analysis.—Calcd. for $C_{13}H_{14}NO_3$ (percent): C, 61.96; H, 5.60; N, 5.56. Found (percent): C, 61.71; H, 5.66; N, 5.39.

(b) 1-N-(α-ethyl-α-methyl-succinimido)-2-chloro-4-sulphonamido-benzene 12.0 g. of the product of (a) above was added to 35 ml. chlorosulphonic acid, heated to 120° C. with stirring and held at this temperature for 10 minutes. The brown solution was then added dropwise into ice water and the precipitate filtered with suction to yield 10.1 g. of brown crystals melting at 128–137°.

The sulphamylchloride so obtained was dissolved in 100 ml. chloroform and added dropwise to 100 ml. ammonia (concentrated) with further stirring then being heated for 15 minutes at 50° C. The solution was reduced in vacuo and the residue dissolved in ethyl acetate and water. The ethyl acetate was separated and evaporated to yield 6.2 g. of a brown product. Yield: 40%.

Recrystallised from ethyl acetate/petrol; white crystals M.P. 169–171° C.

Analysis.—Calcd. for $C_{13}H_{15}N_2O_4SCl$ (percent): C, 47.17; H, 4.57; N, 8.46. Found (percent): C, 46.93; H, 4.51; N, 8.41.

EXAMPLE 5

(a) 1-N-(α-ethyl-α-methyl-succinimido)-2-chloro-6-methyl-benzene 28.3 g. 2-chloro-6-methyl-aniline and 32.2 g. α-methyl-α-ethyl-succinic acid are heated together at 180° C. and held at this temperature for 15 minutes. The red mass is dissolved in ethyl acetate, cooled and the precipitate is filtered with suction.

35.3 g. red-coloured crystals: M.P. 99–105° C. Yield 66%.

Recrystallised from ethyl acetate/petrol ether white crystals M.P. 112–114° C.

Analysis.—Calcd. for $C_{14}H_{16}NO_2Cl$ (percent): C, 63.21; H, 6.06; N, 5.27. Found (percent): C, 63.32; H, 6.10; N, 5.29.

(b) 1-N-(α-ethyl-α-methyl-succinimido)-2-chloro-4-sulphonamido-6-methyl-benzene 10.0 g. of the product of (a) above are added to 40 ml. chlorosulphonic acid, heated to 130° C. and held at this temperature for 15 minutes before added dropwise with stirring into ice-water. The precipitate is dissolved in chloroform added dropwise to 200 ml. concentrated ammonia and heated for 30 minutes under reflux. After reduction in vacuo, the residue is dissolved in ethyl acetate and water; the ethyl acetate is separated and evaporated to yield 8.0 g. white crystals. M.P. 223–225° C. Yield; 66%.

Recrystallised from ethyl acetate/petrol ether.

Analysis.—Calcd. for $C_{14}H_{17}N_2O_4SCl$ (percent): C, 48.88; H, 4.98; N, 8.14. Found (percent): C, 48.90; H, 4.79; N, 8.05.

EXAMPLE 6

(a) 1-N-(α-ethyl-α-methyl-succinimido)-benzene 27.9 g. aniline and 48.0 g. α-ethyl-α-methyl-succinic acid are heated together at 170° C. and held at that temperature for 15 minutes. The resulting oil is then taken up in ethyl acetate, washed with aqueous NaOH and evaporated in vacuo. Petrol ether is added to the residue and the resulting crystals filtered to yield 45.0 g. white crystals melting at: 57–58° C. Yield: 70%.

(b) 1-N-(α-ethyl-α-methyl-succinimido)-4-chlorosulphonyl-benzene 40.0 g. of 1-N-(α-ethyl-α-methyl-succinimido)-benzene are added to 120 ml. chlorosulphonic acid and heated with stirring at 130° C. After holding at that temperature for 5 minutes, the mixture is poured into ice-water, the precipitate is filtered with suction and taken up in chloroform, some petrol ether is added and the mixture is cooled and re-filtered to yield 30.0 g. white crystals M.P. 115–118° C. Yield: 51%.

(c) 1-N-(α-ethyl-α-methyl-succinimido)-4-sulphonamido-benzene

The crude sulphonyl chloride so obtained is then taken up in chloroform and added dropwise with stirring into concentrated ammonia. After heating to 30–40° C. with stirring, the solution is evaporated to dryness in vacuo and the residue recrystallised from ethyl acetate to yield colourless crystals melting at 153–155° C.

The product gives no melting point depression with the product of Example 3.

(d) 1-N-(α-ethyl-α-methyl-succinimido)-4-(N-ethyl-sulphonamido)-benzene 5.0 g. of the sulphonyl chloride of (b) above is added to 5 ml. aqueous ethylamine and heated under reflux for ½ hour. The precipitate is filtered with suction. The residue is dissolved in ethyl acetate and evaporated to dryness. The residue, a clear oil, is triturated with ether and filtered to yield 3.2 g. white crystals melting at 122–128° C. Yield: 62%.

Recrystallised from alcohol while crystals melting at: 133–134° C.

*Analysis.*—Calcd. for $C_{15}H_{20}O_4N_2S$ (percent): C, 55.55; H, 6.22; N, 8.64. Found (percent): C, 55.25; H, 6.36; N, 8.59.

(e) 1-N-(α-ethyl-α-methyl-succinimido)-4-(N-β-hydroxyethyl)-sulphonamido-benzene 5.0 g. of the product of (e) above are dissolved in 20 ml. chloroform and
1.94 g. ethanolamine in
20 ml. chloroform are added with stirring and heated under reflux for 1 hour. An oil precipitates; some water is added and the chloroform layer is separated and evaporated. The residue is dissolved in ethyl acetate, washed with water and evaporated. Ether is added to the residue which is well triturated and filtered with suction to yield:
3.5 g. white crystals melting at 105–110° C. Yield: 64%.

Recrystallised from ethyl acetate/petrol ether white crystals melting at: 110–112° C.
*Analysis.*—Calcd. for $C_{15}H_{20}N_2O_5S$ (percent): C, 52.93; H, 5.92; N, 8.23. Found (percent): C, 52.89; H, 5.99; N, 8.20.

(f) 1-N-(α-ethyl-α-methyl-succinimido)-4-(N-methyl)-sulphonamido-benzene 5.0 g. of the product of (b) above are dissolved in
100 ml. chloroform, and
15 ml. aqueous methylamine are added with stirring at 35° C. After stirring for a further 15 minutes the product is washed with chloroform and water and evaporated in vacuo. The residue is triturated well with ether and the crystals evaporated with suction to yield
3.5 g. white crystals of melting point: 122–125° C. Yield 71%.

*Analysis.*—Calcd. for $C_{14}H_{18}N_2O_4S$ (percent): C, 54.19; H, 5.85; N, 9.03. Found (percent): C, 54.24; H, 5.79; N, 8.99.

(g) 1-N-(α-ethyl-α-methyl-succinimido)-4-(N-acetyl-N-methyl)-sulphonamido-benzene 5.0 g. of the product of (f) above,
2.5 g. pyridine (2 mol) and
20 ml. acetic anhydride are heated together for 2 hours under reflux. The whole is then evaporated in vacuo to yield
5.4 g. of a clear brown oil.

The oil is dissolved in ethyl acetate, petrol ether is added, the mixture is cooled and the crystals which form are filtered to yield:
4.5 g. white crystals melting at: 136–139° C. Yield: 80%.

Recrystallised from ethyl acetate for analysis.
*Analysis.*—Calcd. for $C_{16}H_{20}O_5N_2S$ (percent): C, 54.54; H, 5.72; N, 7.95. Found (percent): C, 54.62; H, 5.80; N, 7.93.

EXAMPLE 7

1-N-(α-ethyl-α-methyl-succinimido)-4-(N-acetyl)-sulphonamido-benzene 14.5 g. of the product of Example 3
8.0 g. pyridine and
80 ml. acetic anhydride are heated together for 2 hours under reflux. The mixture is evaporated in vacuo and the residue dissolved in ether, cooled well and filtered to yield:
13.2 g. of a brown product. Yield: 78%.

Recrystallisation from ethyl acetate/petrol ether gave white crystals melting at: 187–189° C.
*Analysis.*—Calcd. for $C_{15}H_{18}N_2O_5S$ (percent): C, 53.30; H, 5.37; N, 8.29. Found (percent): C, 53.01; H, 5.52; N, 8.23.

EXAMPLE 8

(a) 1-N-(α-ethyl-α-methyl-succinimido)-2-methyl-benzene 21.4 g. o-toluidine and
32.2 g. α-ethyl-α-methyl-succinic acid are heated together at 150° C. and held at that temperature for 15 minutes. The product is dissolved in ethyl acetate, washed with aqueous NaOH, dried and evaporated to yield a dark brown oil. On distillation in high vacuum, one obtains 25.8 g. of a yellow oil boiling at 148–150° C./0.4 mm.

*Analysis.*—Calcd. for $C_{14}H_{17}O_2N$ (percent): C, 72.79; H, 7.42; N, 6.06. Found (percent): C, 72.50; H, 7.35; N, 6.01.

(b) 1-N-(α-ethyl-α-methyl-succinimido)-2-methyl-5-sulphonamido-benzene 10.0 g. N-(o-toloyl)-α-ethyl-α-methyl-succinimide (obtained in (a) above) are added to
10 ml. chlorosulphonic acid and heated to 100° C. After holding at that temperature for 15 minutes, the dark solution is added dropwise into ice-water. The precipitate is dissolved in chloroform, added dropwise to
50 ml. concentrated ammonia and heated for 15 minutes under reflux. After evaporation to dryness in vacuo, the residue is dissolved in ethyl acetate and water and the ethyl acetate layer separated, reduced to 100 ml. by evaporation, cooled and the precipitated crystals filtered with suction to yield
7.0 g. white crystals melting at: 178–184° C. Yield: 48%.

Recrystallised from ethyl acetate/petrol ether: white crystals M.P.: 183–185° C.
*Analysis.*—Calcd. for $C_{14}H_{18}O_4N_2S$ (percent): C, 54.24; H, 5.85; N, 9.04. Found (percent): C, 54.00; H, 5.61; N, 8.84.

EXAMPLE 9

(a) 1-N-(α-ethyl-α-methyl-succinimido)-2-methyl-benzene-4-sulphonic acid sodium salt 31.7 g. α-ethyl-α-methyl-succinic acid and
42.0 g. 2-methyl-aniline-4-sulphonic acid sodium salt are heated together at 180° C. and held at that temperature for 15 minutes to yield
63.5 g. of a brown solid mass.

(b) 1-N-(α-ethyl-α-methyl-succinimido)-2-methyl-4-sulphonamido-benzene 63.5 g. of the product of (a) above are dissolved in
100 ml. N,N-dimethylformamide
30 ml. SOCl$_2$ are then added and the mixture left to stand for 2 hours.

The brown solution was poured onto ice and the precipitate was filtered off, dissolved in ether, chloroform was added thereto and, with stirring,
50 ml. ammonia (concentrated) were added dropwise. After heating for 15 minutes under reflux, the mixture was evaporated down to about 50 ml. and the precipitate filtered off to yield
31.8 g. brown crystals melting at 157–164° C. Yield: 54%.

Recrystallisation from ethyl acetate/petrol ether gave white crystals melting at: 186–188° C.
*Analysis.*—Calcd. for $C_{14}H_{18}O_4N_2S$ (percent): C, 54.24; H, 5.85; N, 9.04. Found (percent): C, 54.12; H, 5.68; N, 8.95.

EXAMPLE 10

1-N-(α-ethyl-α-methyl-succinimido)-3-chloro-4-methyl-benzene 28.3 g. 3-chloro-4-methylaniline and
32.2 g. α-ethyl-α-methyl-succinic acid are heated together at 180° C. and held at this temperature for 200 minutes. The residue is dissolved in ethyl acetate and petrol ether added. The precipitated crystals are filtered to yield 42.2 g. white crystals, melting at 89–91° C. Yield: 80%.

Recrystallised from ethyl acetate/petrol ether.

Analysis.—Calcd. for $C_{14}H_{16}NO_2Cl$ (percent): C, 63.21; H, 6.06; N, 5.27. Found (percent): C, 63.39; H, 5.83; N, 5.23.

EXAMPLE 11

1-N-(α-ethyl-α-methyl-succinimido)-2-methyl-3-chloro-benzene 28.3 g. 3-chloro-2-methylaniline and 32.3 g. α-ethyl-α-methyl-succinic acid are heated together at 180° C. and held at that temperature for 20 minutes. The resulting oil is taken up in ethyl acetate, washed with aqueous NaOH, evaporated down to about 100 ml. and after added petrol ether, cooled and the precipitate filtered to yield 28.2 g. white crystals melting at: 93–95° C. Yield: 53%.

Recrystallised from petrol ether.

Analysis.—Calcd. for $C_{14}H_{16}NO_2Cl$ (percent): C, 63.21; H, 6.06; N, 5.27. Found (percent): C, 63.00; H, 5.84; N, 5.22.

EXAMPLE 12

1-N-(α-ethyl-α-methyl-succinimido)-4-(N-(N-n-butylcarbamyl))-sulphonamido-benzene 3.3 g. n-butylamine dissolved in a little chloroform are added dropwise with stirring to a solution in a little chloroform of 9.8 g. of the isocyanate derivative of 1-N-(α-ethyl-α-methyl-succinimido)-4-sulphonamido-benzene (prepared by passing phosgene into a solution of the product of Example 3 in trichlorobenzene at 120° C.).

The mixture is then stirred at room temperature for 2 hours and the precipitate filtered with suction to yield 4.4 g. of a white product.

Recrystallisation from ethanol yielded 3.0 g. white crystals melting at 130–132° C.

Analysis.—Calcd. for $C_{18}H_{25}N_3O_5S$ (percent): C, 54.73; H, 6.38; N, 10.64. Found (percent): C, 54.34; H, 6.17; N, 10.66.

EXAMPLE 13

1-N-(α-ethyl-α-methyl-succinimido)-4-N-(ethoxy-carbonyl-methyl)-sulphonamido-benzene 32.8 g. ethyl glycinate are dissolved in 200 ml. ethyl acetate 50.0 g. of the product of Example 6(b) in 200 ml. ethyl acetate are added and the mixture heated for 5 minutes in the water bath. The solution is evaporated down to 200 ml. in vacuo, filtered over charcoal and then evaporated to dryness to yield 50 g. of a red oil. The oil is dissolved in 400 ml. ether, filtered and the filtrate allowed to stand for 48 hours. The crystals so formed are filtered off to yield 20 g. of a white product M.P.: 65–75° C. 8.0 g. of this product are chromatographed and 3.1 g. of an oil are obtained from the chloroform fraction. This oil is treated with ether, allowed to stand and the precipitate so formed is filtered off to yield:

3.1 g. white crystals melting at: 78–81° C.

Analysis.—Calcd. for $C_{17}H_{22}O_6N_2S$ (percent): C, 53.40; H, 5.80; N, 7.33. Found (percent): C, 53.15; H, 5.89; N, 7.19.

EXAMPLE 14

1-N-(α-ethyl-α-methyl-succinimido)-3-chloro-4-methyl-benzene sulphonamide 30.0 g. of the product of Example 10 are added to 100 ml. chlorosulphonic acid. The solution is heated to 130° C. with stirring, held for 10 minutes at this temperature and then poured onto ice. The precipitated product is dissolved in chloroform and added dropwise to 500 ml. concentrated ammonia. The solution is evaporated to dryness and the residue extracted with ethyl ethyl acetate. The ethyl acetate is dried over $Na_2SO_4$ and evaporated to yield 25.2 g. of a yellow oil. This oil is dissolved in ethyl acetate and petrol ether is added. The precipitate is filtered, the ethyl acetate/petrol ether solution is evaporated and the residue is dissolved in chloroform. Petrol ether is added and the precipitate, after filtration, is recrystallised from chloroform/petrol ether to yield the desired product 7.8 g. of white crystals melting at: 142–145° C.

Analysis.—Calcd. for $C_{14}H_{17}O_4N_2SCl$ (percent): C, 48.88; H, 4.98; N, 8.14. Found (percent): C, 48.69; H, 5.01; N, 8.08.

EXAMPLE 15

N-(β-ethyl-methyl-hemisucinyl)-p-chloroaniline 25.4 g. p-chloroaniline are dissolved in 120 ml. ether. This solution is added to 28.4 g. α-ethyl-α-methyl-succinic acid anhydride in 150 ml. ether. After gentle heating, the product is cooled and the precipitate filtered with suction to yield:

35 g. of a red coloured product.

Recrystallisation from ethyl acetate yields white crystals melting at: 168–172° C.

Analysis.—Calcd. for $C_{13}H_{16}O_3NCl$ (percent): C, 57.88; H, 5.98; N, 5.19. Found (percent): C, 57.85; H, 6.03; N, 5.18.

EXAMPLE 16

1-N-(α-ethyl-α-methyl-succinimido)-2-methyl-3-chloro-benzene sulphonamide 15.0 g. of 1-N-(α-ethyl-α-methyl-succinimido)-2-methyl-3-chloro-benzene are added to 50 ml. chlorosulphonic acid, heated to 130° C. held at that temperature for 10 minutes, cooled and poured with stirring into 500 ml. ice water. The resulting precipitate is dissolved in chloroform and the chloroform solution evaporated to 100 ml. and added to 200 ml. concentrated ammonia. After heating for 20 minutes under reflux the solution is evaporated in vacuo and the residue is dissolved in ethyl acetate, washed with water and dried to yield 13.9 g. of a brown oil.

This oil is dissolved in ethyl acetate, filtered through activated charcoal, precipitated about 5 times with petrol ether and filtered off to yield 4.5 g. light brown crystals melting at 145–163° C.

Recrystallisation from ethyl acetate yielded white crystals melting at 180–181° C.

Analysis.—Calcd. for $C_{14}H_{17}O_4N_2ClS$ (percent): C, 48.74; H, 4.97; N, 8.12. Found (percent): C, 48.72; H, 4.99; N, 8.14.

EXAMPLE 17

1-N-(α-ethyl-α-methyl-succinimido)-4-(N-2-thiazolyl)-sulphonamido-benzene 25.5 g. sulphathiazole and 16.0 g. α-ethyl-α-methyl-succinic acid anhydride are heated together to 230–235° C. and held at this temperature for 15 minutes. The product is cooled and recrystalised from chloroform/petrol ether to yield:

15.5 g. white crystals melting at 214–216° C.

Analysis.—Calcd. for $C_{16}H_{17}O_4N_3S$ (percent): C, 50.70; H, 4.52; N, 11.09. Found (percent): C, 50.19; H, 5.16; N, 10.97.

EXAMPLE 18

N-(α-ethyl-α-methyl-hemisuccinyl)-aniline 9.3 g. of aniline are dissolved in 50 ml. of ether and 14.2 g. of α-methyl-α-ethyl-succinic acid anhydride in 50 ml. of ether is added.

Upon addition of these components, the solution became warm and a white precipitate separated out. After filtering it with suction 18.7 g. of white crystals, M.P.: 160–163° C. are obtained.

Recrystallised from ethyl acetate/petroleum ether, white crystals of M.P.: 169–170° C. are obtained.

*Analysis.*—Calcd. for $C_{13}H_{17}NO_3$ (percent): C, 66.36; H, 7.28; N, 5.95. Found (percent): C, 66.39; H, 7.28; N, 5.85.

This product can be converted to the p-sulphonamido derivative by the method of Example 1(b).

EXAMPLE 19

1-N-(α-ethyl-α-methyl-succinimido)-4-chloro-benzene 25.5 g. of p-chloroaniline and
32.2 g. of α-methyl-α-ethyl-succinic acid are heated together at 170° C. The resulting red oil is taken up with ethyl acetate, filtered over activated charcoal and concentrated. The oil is then distilled in a high vacuum. A colourless oil of B.P. 145° C./0.2 mm. is obtained which, upon addition of petroleum ether, cooling and filtering with suction, yields 29.4 g. of white crystals of M.P.: 52–55° C. After recrystallisation from ether/petroleum ether, white crystals of M.P.: 55–57° C. are obtained.

*Analysis.*—Calcd. for $C_{13}H_{14}NO_2Cl$ (percent): C, 62.10; H, 5.60; N, 5.56. Found (percent): C, 62.22; H, 5.59; N, 5.62.

This product may be converted to a sulphonamide derivative by the method of Example 1(b).

EXAMPLE 20

(a) N-(α-ethyl-α-methyl-succinimido)-phenyl-methane 10.7 g. of benzylamine and
16.0 g. of α-methyl-α-ethyl-succinic acid are heated together at 170° C. After 15 minutes the oil is taken up with ethyl acetate, washed first with 2 N NaOH and then with HCl and water, dried and distilled 16.9 g. of a light-yellow oil are obtained which after distilling in a high vacuum at 0.08 mm., yield 13.7 g. of a colourless oil, boiling point 122° C.

*Analysis.*—Calcd. for $C_{14}H_{17}NO_2$ (percent): C, 72.79; H, 7.42; N, 6.06. Found (percent): C, 72.73; H, 7.34; N, 6.16.

(b) N-(α-ethyl-α-methyl-succinimido)-(p-sulphonamidophenyl)methane 25 ml. of chlorosulphonic acid are added with stirring to 25 g. of the compound of Example 20(a). The mixture is heated at 100° C. and after 15 minutes poured dropwise onto ice. The precipitate is taken up with $CHCl_3$ and the $CHCl_3$ solution added dropwise to 100 ml. of concentrated ammonia and then concentrated in vacuo. The residue is extracted with ethyl acetate/water, the ethyl acetate solution is dried over $Na_2SO_4$, filtered over activated charcoal and concentrated.

22 g. of a yellow, clear oil are obtained.

*Analysis.*—Calc'd for $C_{14}H_{18}N_2O_4S$ (percent): C, 54.24; H, 5.85; N, 9.04. Found (percent): C, 54.18 H, 5.85; N, 9.05.

EXAMPLE 21

1-N-(α-ethyl-α-methyl-succinimido)-2-benzoyl-4-chloro-benzene 2.3 g. of 2-amino-5-chloro-benzophenone and
1.6 g. of α-methyl-α-ethyl-succinic acid are heated together in an open flask at 170° C. After cooling, the oil is taken up with ethyl acetate, washed with 2 N NaOH and 2 N HCl, dried over $Na_2SO_4$, filtered over activated charcoal and concentrated, thus yielding 1.8 g. of a yellow oil from which, after triturating with petroleum ether, strong cooling and filtering with suction, 1.0 g. of light-yellow crystals, M.P.: 116–118° C. are obtained.

After recrystallisation from cyclohexane, white crystals of M.P.: 120–122° C. are obtained.

*Analysis.*—Calc'd for $C_{20}H_{18}NO_3Cl$ (percent): C, 67.53; H, 5.10; N, 3.95. Found (percent): C, 67.37; H, 5.14; N, 3.96.

This product can be converted into a sulphonamido derivative by reaction with chlorosulphonic acid followed by addition of ammonia as in Example 1(a).

EXAMPLE 22

N-(β-ethyl-β-methyl-hemisuccinyl)-4-sulphonamido-aniline 8.6 g. of sulphanilamide and
7.1 g. of α-methyl-α-ethyl-succinic acid anhydride are heated together at 100° C. and then dissolved in ethyl acetate and $NaHCO_3$. The $NaHCO_3$-solution is acidified with HCl and the precipitate filtered with suction and dried 9.2 g. of white crystals are obtained of M.P.: 165–168° C. which after recrystallisation from ethyl acetate/petroleum ether yield 7.5 g. of white crystals of M.P.: 173–174° C.

*Analysis.*—Calc'd for $C_{13}H_{18}N_2O_5S$ (percent): C, 49.72; H, 5.78; N, 8.92. Found (percent): C, 49.82; H, 5.74; N, 8.93.

EXAMPLE 23

1-N-(α-ethyl-α-methyl-succinimido)-2-methyl-5-nitro-benzene 15.2 g. of 2-amino-4-nitrotoluene and
16.0 g. of α-methyl-α-ethyl-succinic acid are heated together in a flask at 170° C., and kept at this temperature for 20 minutes, then taken up with ethyl acetate and extracted with HCl and $NaHCO_3$, washed with water and concentrated 21.5 g. of a yellow product (M.P.: 105–115° C.) are obtained.

After recrystallisation from ethyl acetate/petroleum ether over activated charcoal, 18.5 g. of light-yellow crystals (M.P.: 141–143° C.) are obtained.

*Analysis.*—Calc'd for $C_{14}H_{16}N_2O_4$ (percent): C, 60.92; H, 5.84; N, 10.15. Found (percent): C, 60.50; H, 5.67; N, 9.99.

EXAMPLE 24

(a) 1-N-(α-ethyl-α-methyl-succinimido)-2-methyl-5-amino-benzene 27.6 g. of the nitro-compound of Example 23
250 ml. of ethyl acetate and 3 spatula tips of $PtO_2$ are hydrogenated
  Hydrogenation:
   Theory—7.5 litres $H_2$
   Practice—7.9 litres
   Time—4 hours The catalyst is filtered off and the residue concentrated.

28.3 g. of a brown oil are obtained which after recrystallising from ethyl acetate/petroleum ether over activated charcoal, yields 17.4 g. of white crystals, M.P.: 95–97° C.

*Analysis.*—Calc'd for $C_{14}H_{18}N_2O_2$ (percent): C, 68.35; H, 7.38; N, 11.39. Found (percent): C, 68.28; H, 7.42; N, 11.38.

(b) 1-N-(α-ethyl-α-methyl-succinimido)-2-methyl-5-diacetylamido-benzene

Cyclohexane is added to the combined ethyl acetate/petroleum ether solutions from (a) above and the precipitates filtered with suction.

1.7 g. of light-yellow crystals, M.P.: 78–87° C., are obtained which, after recrystallisation from ether/petroleum ether yield 1.5 g. of white crystals, M.P.: 103–105° C.

*Analysis.*—Calc'd for $C_{18}H_{22}N_2O_4$ (percent): C, 65.51; H, 6.72; N, 8.49. Found (percent): C, 65.51; H, 6.90; N, 8.43.

(c) 1-N-(α-ethyl-α-methyl-succinimido)-2-methyl-5-acetamido-benzene 2.5 g. of the amino-compound according to (a) above and 1.6 g. of pyridine (2 mol) are refluxed for two hours in 30 ml. of acetic acid anhydride.

The clear solution is concentrated in vacuo, the residue taken up with ethyl acetate, washed with HCl and water, and the ethyl acetate is dried and concentrated.

4.0 g. of a yellow oil is obtained which is taken up with ethyl acetate and precipitated with petroleum ether, yielding 0.2 g. of a brown product (M.P.: 185–191° C.) which is recrystallised with ethyl acetate/petroleum ether 0.2 g. of white crystals, M.P.: 195–197° C. are obtained.

*Analysis.*—Calc'd for $C_{16}H_{20}N_2O_3$ (percent): C, 66.72; H, 7.00; N, 9.73. Found (percent): C, 66.68; H, 6.99; N, 9.75.

EXAMPLE 25

1-N-(α,α-dimethyl-succinimido)-4-sulphonamido-benzene 17.2 g. sulphanilamide and 14.6 g. of α,α-dimethyl-succinic acid anhydride are heated together for 30 minutes at 180° C. After cooling, the oil is taken up with dioxan, ether added and it is cooled and filtered with suction, to give 20.4 g. of white crystals, M.P.: 213–215° C., yield: 72% after recrystallisation from dimethyl-formamide/ether.

*Analysis.*—Calc'd for $C_{12}H_{14}N_2O_4S$ (percent): C, 51.11; H, 5.00; N, 9.93. Found (percent): C, 50.99; H, 5.02; N, 9.91.

EXAMPLE 26

1-N-(α,α-diethyl-succinimido)-4-sulphonamido-benzene 17.2 g. of sulphanilamide and 17.4 g. of α,α-dimethyl-succinic acid anhydride are heated together for 20 minutes at 170° C. After cooling, the oil is taken up with ethyl acetate, cooled and filtered with suction.

23.4 g. of a light-brown product (M.P.: 125–132° C., yield 75%) are obtained which, after recrystallisation from ethyl acetate/petroleum ether, gives white crystals of M.P.: 129–131° C.

*Analysis.*—Calcd. for $C_{14}H_{18}N_2O_4S$ (percent): C, 54.24; H, 5.85; N, 9.04. Found (percent): C, 54.11; H, 5.97; N, 8.93.

EXAMPLE 27

1-N-(α-ethyl-α-methyl-succinimido)-3-sulphonamido-4-carboxy-benzene 7.0 g. of 6-amino-saccharin (Lit. Beilstein 27, p. 426) and 8.7 g. of α-methyl-α-ethyl-succinic acid are heated together at 220° C. and kept for half an hour at this temperature. The oil is then taken up with ethyl acetate and the insoluble material filtered with suction.

1.9 g. of a brown product of M.P.: 300° C. is obtained which was rejected. A large amount of petroleum ether is then added to the filtrate which is cooled, and the precipitated material is filtered with suction.

5.0 of a light-grey product are obtained. A large amount of ether is added to these crystals which are filtered (not everything was soluble). A large amount of petroleum ether is then added to the ether solution which is then cooled, and the precipitated material is filtered with suction.

3.3 g. of a white product (M.P.: 94–97° C. with decomposition) is obtained.

After recrystallising again the melting point remains the same.

The product produced with $NaHCO_3$ a $CO_2$-development. In the IR-spectrum the carboxyl band is clearly visible.

*Analysis.*—Calcd. for $C_{14}H_{16}N_2O_6S$ (percent): C, 49.60; H, 4.72; N, 8.52. Found (percent): C, 49.96; H, 4.72; N, 8.52.

EXAMPLE 28

6-(α-methyl-α-ethyl-succinimido)-saccharin 6.5 g. of the compound according to Example 27, 4-(α-methyl-α-ethyl)-succinimido-6-sulphonamido-benzoic acid and 40 ml. of acetic acid anhydride are refluxed for 40 minutes. The excess anhydride is distilled off; the residue is taken up with ethyl acetate/petroleum ether added and the residue which has separated out is filtered with suction. 6-(α-methyl-α-ethyl-succinimido)-saccharin is obtained in the form of 5.5 g. of white crystals, M.P.: 185–188° C.

EXAMPLE 29

1-N-[α,α-dimethyl-succinimido)-3-sulphonamido-4-carboxy-benzene 4.0 g. of 6-amino-saccharin and 5.7 g. of α-dimethyl-succinic acid are heated together for 40 minutes at 220° C. The reaction mixture is dissolved in ethyl acetate, filtered over activated charcoal, petroleum ether added and the residue which has separated out is filtered with suction.

4.5 g. of a yellowish product of M.P.: (216) 235–240° C. are obtained. Recrystallised from ethyl acetate/petroleum ether.

4-(α - dimethyl - succinylamido)-6-sulphonylamido-benzoic acid is obtained in the form of white crystals. M.P,: (220) 235–240° C.

EXAMPLE 30

6-(α-methyl-α-methyl-succinimido)-2,3-dehydrobenzo-1,2-thiazolon-3-dioxide-(1,1)

1.5 g. of 4-(α-dimethyl-succinylimido)-6-sulphonamido-benzoic acid and 25 ml. of acetic acid anhydride are refluxed for 10 minutes.

After distilling off the acetic acid anhydride, the residue is taken up with ethyl acetate, petroleum ether added and the residue which has separated out is filtered with suction.

White crystals are obtained; after recrystallising from ethyl acetate/petroleum ether 1.3 g. of 6-(α-dimethyl-succinylamido)-saccharin is obtained in the form of white crystals of M.P.: 188–190° C.

EXAMPLE 31

1-N-(α-ethyl-α-methyl-succinimido)-2-methyl-5-sulphonamido-benzene 12.3 g. α-methyl-α-ethyl-succinimido-2-methyl-5-aminobenzene prepared according to Example 24 are dissolved in 200 ml. 2 N HCl at 0° C. and a solution of 3.5 g. NaNO₂ in 40 ml. water added slowly dropwise. 80 ml. Glacial acetic acid saturated with SO₂ and a solution of
6.7 g. CuCl₂ in 40 ml. water are mixed and the above diazonium solution is added dropwise at 20° C. with stirring and constant passage of SO₂. Nitrogen is evolved. The precipitated brown product is filtered with suction, dissolved in
100 ml. chloroform and
100 ml. ammonia (concentrated) are added dropwise at 20° C. The mixture is heated for 15 min. under reflux and then concentrated in vacuo. The residue is taken up in ethyl acetate and water and the ethyl acetate layer separated, dried and distilled to yield 0.6 g. of a brown product: M.P.: 165-178° C.

Recrystallisation from ethyl acetate/petrol ether yielded white crystals: M.P.: 186-188° C. Mixed M.P. with product of Example 8(b): 186-188° C.

I claim:

1. A compound selected from the group consisting of (a) a compound of the formula

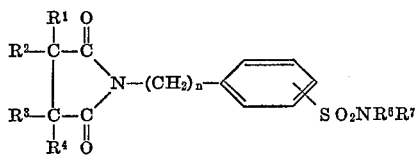

wherein R¹, R², R³ and R⁴ are hydrogen or alkyl of 1-5 carbon atoms, at least one of R¹, R², R³ and R⁴ being said alkyl and R⁶ and R⁷ are hydrogen, thiazolyl, pyrimidyl, alkyl of 1-5 carbon atoms, acetyl, β-hydroxyethyl, n-butylcarbamyl or ethoxycarbonyl-methyl or R⁶ and R⁷ together with the nitrogen atom to which they are attached are piperidyl or piperazyl, R⁶ or R⁷ being thiazolyl or pyrimidyl only when at least two of R¹, R², R³ and R⁴ are alkyl of 1-5 carbon atoms, and n is 0 or 1; (b) a compound corresponding to said compound (a) wherein the —SO₂NR⁶R⁷ group is joined to a substituent on an adjacent carbon atom of the benzene ring to form the chain —CO—NH—SO₂—; (c) a compound corresponding to said compounds (a) and (b) substituted on the benzene ring by at least one of halogen, lower alkyl, alkoxy of 1-5 carbon atoms, hydroxy, alkanoyl amido of 1-5 carbon atoms, nitro amino, carboxyl, acetyl or benzoyl; and (d) a pharmaceutically acceptable salt of said compounds (a), (b) and (c).

2. A compound as claimed in claim 1 wherein at least two of R¹, R², R³ and R⁴ are alkyl of 1-5 carbon atoms.

3. A compound as claimed in claim 1 wherein n is 0, R¹ and R² are each alkyl of 1-5 carbon atoms and R³ and R⁴ are each hydrogen or alkyl of 1-5 carbon atoms.

4. A compound as claimed in claim 1 wherein R¹ is methyl, R² is ethyl and R³ and R⁴ are each hydrogen.

5. A compound as claimed in claim 3 wherein at least one of R⁶ and R⁷ is thiazolyl or pyrimidyl.

6. A compound as claimed in claim 3 wherein R⁶ and R⁷ together with the nitrogen atom to which they are attached are piperidyl or piperazyl.

7. A compound as claimed in claim 3 wherein at least one of R⁶ and R⁷ is methyl, ethyl, propyl, butyl, amyl, acetyl, n-butylcarbamyl, β-hydroxyethyl or ethoxycarbonyl-methyl.

8. A compound as claimed in claim 3 wherein the —SO₂NR⁶R⁷ is joined to a carboxyl substituent on an adjacent carbon atom of the benzene ring to form the chain —CO—NH—SO₂—.

9. A compound as claimed in claim 1 wherein n is 1.

10. 1-(α-ethyl-α-methyl-succinimido)-4-sulphonamido-benzene.

References Cited

UNITED STATES PATENTS 2,414,403  1/1947  Winterbottom _____ 260—239.6

FOREIGN PATENTS 595,038  11/1947  Great Britain _____ 260—239.6

OTHER REFERENCES

Miller et al.: JACS 61: 1198-200 (1939).
Moore et al.: JACS 64: 1572-1576 (1942).
Morthey: The Sulfonamides and Allied Compounds (Reinhold, N.Y., 1948), pp. 37, 117-118.
Barakat et al.: C.A. 52: 7327 (June 1948).

HENRY R. JILES, Primary Examiner

C. M. SHURKO, Assistant Examiner

U.S. Cl. X.R.

260—239.7, 239.75, 239.8, 239.9, 239.95, 256.5, 268, 293.4, 294.8, 304, 306.8, 309, 326.5; 424—229, 250, 251, 263, 267, 270, 273, 274